US012182378B2

(12) United States Patent
Norman et al.

(10) Patent No.: US 12,182,378 B2
(45) Date of Patent: Dec. 31, 2024

(54) METHODS AND SYSTEMS FOR OBJECT SELECTION

(71) Applicant: RIOT GAMES, INC., Santa Monica, CA (US)

(72) Inventors: Christina Norman, Los Angeles, CA (US); Kuo-Yen Lo, Los Angeles, CA (US)

(73) Assignee: Riot Games, Inc., Los Angeles, CA (US)

( * ) Notice: Subject to any disclaimer, the term of this patent is extended or adjusted under 35 U.S.C. 154(b) by 0 days.

(21) Appl. No.: 17/558,232

(22) Filed: Dec. 21, 2021

(65) Prior Publication Data
US 2022/0113844 A1 Apr. 14, 2022

Related U.S. Application Data

(63) Continuation of application No. 15/480,221, filed on Apr. 5, 2017, now abandoned.

(51) Int. Cl.
*G06F 3/0482* (2013.01)
*G06F 1/16* (2006.01)
(Continued)

(52) U.S. Cl.
CPC ............ *G06F 3/0482* (2013.01); *G06F 1/163* (2013.01); *G06F 3/011* (2013.01); *G06F 3/0484* (2013.01); *G06F 3/04842* (2013.01); *G06F 3/04883* (2013.01); *G06F 3/0488* (2013.01); *H04W 4/02* (2013.01)

(58) Field of Classification Search
CPC ........ G06F 3/0482; G06F 1/163; G06F 3/011; G06F 3/0484; G06F 3/04842; G06F 3/04883; G06F 3/0488; H04W 4/02
See application file for complete search history.

(56) References Cited

U.S. PATENT DOCUMENTS 5,757,358 A * 5/1998 Osga ................... G06F 3/04842
345/157
6,049,326 A * 4/2000 Beyda ................... G06F 3/0482
345/157
(Continued)

FOREIGN PATENT DOCUMENTS

WO 2016/201971 A1 12/2016
WO 2016/202119 A1 12/2016

OTHER PUBLICATIONS

BlizzardGuides (Jun. 5, 2012) Belial Class Guide [Web Page]. Retrieved from https://web.archive.org/web/20140812002810/http://www.blizzardguides.com/diablo3/Belial.html (Year: 2012) (Year: 2012).*
(Continued)

*Primary Examiner* — Cesar B Paula
*Assistant Examiner* — David Tan
(74) *Attorney, Agent, or Firm* — Shook, Hardy & Bacon L.L.P.

(57) ABSTRACT

A method for identifying and selecting an object in a virtual or real environment is disclosed. The method comprises: determining a target finder area, at a computing device, within an area displayed by the user interface based on a user profile; determining a list of one or more objects within the target finder area; and presenting one or more of the determined list of one or more objects on the user interface.

20 Claims, 14 Drawing Sheets

(51) Int. Cl.
*G06F 3/01* (2006.01)
*G06F 3/0484* (2022.01)
*G06F 3/04842* (2022.01)
*G06F 3/0488* (2022.01)
*G06F 3/04883* (2022.01)
*H04W 4/02* (2018.01)

(56) References Cited

U.S. PATENT DOCUMENTS

| | | | |
|---|---|---|---|
| 6,374,272 | B2 | 4/2002 | Bates et al. |
| 6,559,872 | B1* | 5/2003 | Lehikoinen ......... G06F 3/04842 |
| | | | 345/157 |
| 6,657,627 | B1 | 12/2003 | Wada et al. |
| 7,402,104 | B2 | 7/2008 | Ogita et al. |
| 8,491,395 | B2 | 7/2013 | Auterio et al. |
| 9,449,343 | B2 | 9/2016 | Mayerle et al. |
| 9,789,406 | B2 | 10/2017 | Marr et al. |
| 2007/0005423 | A1* | 1/2007 | Levien ............... G06Q 30/0267 |
| | | | 705/14.69 |
| 2007/0078929 | A1 | 4/2007 | Beverly |
| 2009/0309872 | A1* | 12/2009 | Kawabata ............. G06T 15/405 |
| | | | 345/418 |
| 2012/0040743 | A1 | 2/2012 | Auterio et al. |
| 2012/0128217 | A1* | 5/2012 | Satoh ................. G01C 21/3844 |
| | | | 382/113 |
| 2015/0026637 | A1* | 1/2015 | Ross ................... G06F 3/04817 |
| | | | 715/810 |
| 2015/0031421 | A1* | 1/2015 | Jo ........................... A63F 13/30 |
| | | | 463/2 |
| 2015/0157940 | A1* | 6/2015 | Hall .................... A63F 13/5372 |
| | | | 463/31 |
| 2015/0238864 | A1 | 8/2015 | Taoka et al. |
| 2015/0371537 | A1 | 12/2015 | Eilertsen |
| 2016/0001181 | A1* | 1/2016 | Marr ................... G07F 17/3227 |
| | | | 463/42 |
| 2016/0129345 | A1 | 5/2016 | Seok et al. |
| 2016/0256777 | A1 | 9/2016 | Umebayashi et al. |
| 2017/0340959 | A1 | 11/2017 | Tang et al. |
| 2017/0361230 | A1 | 12/2017 | Tang et al. |
| 2018/0004283 | A1* | 1/2018 | Mathey-Owens ........................ |
| | | | G06F 3/04842 |
| 2018/0028918 | A1* | 2/2018 | Tang ..................... G06F 3/0482 |

OTHER PUBLICATIONS

"Belial Class Guide", BlizzardGuides, Retrieved from Internet URL : https://web.archive.org/web/20140812002810/http://www.blizzardguides.com/diablo3/Belial.html, pp. 4 (Jun. 5, 2012).

"Game Mechanics Explained in Depth (Numbers and Rules)", QuantumZenoEffect, pp. 1-2 (2015).

Berg, J.V.D., et al., "Reciprocal Velocity Obstacles for Real-Time Multi-Agent Navigation", Proceedings of the IEEE International Conference on Robotics and Automation (ICRA), pp. 1-8 (2008).

* cited by examiner

METHODS AND SYSTEMS FOR OBJECT SELECTION

CROSS-REFERENCE TO RELATED APPLICATIONS

This application is a continuation of, and claims the benefit of priority to, U.S. patent application Ser. No. 15/480,221 filed on Apr. 5, 2017, entitled "Methods and Systems for Object Selection," which is hereby incorporated by reference in its entirety.

BACKGROUND

Object identification and selection can be a challenging task in a target rich environment such as in massively multiplayer online game (MMOG) environment where there are many players and computer generated characters. Other target rich environments are grocery stores and department stores where many products are tightly placed together on shelves and racks. As such the process of identifying and selecting a product can be challenging, particularly when it is done via a device using a user interface (e.g., touchscreen, virtual headset, etc.). Adding more to this complexity, in the MMOG environment, many in-game objects are constantly moving and, in some cases, may overlap or move behind one another. This makes the task of object selection even harder. Accordingly, what is needed is an improved method for object identification and selection.

SUMMARY

Target identification and selection can be challenging in a MMOG environment because many NPC mobs and human player characters can occupy a small virtual space (e.g., in a boss raid). In addition, NPC mobs are constantly moving around and often move in a tight group. This can be challenging for a touchscreen user interface or a virtual/augmented reality headset to quickly identify and select an object with pinpoint accuracy. Accordingly, to assist the user in identifying and selecting a specific target and/or staying on a specific target, a method and system for object identification and/or selection is provided below.

In some embodiments, the method for identifying and selecting an object comprises: determining a target finder area, at a computing device, within an area displayed by the user interface based on a user profile; determining a list of one or more objects within the target finder area; and presenting one or more of the determined list of one or more objects on the user interface. The presentation of an object may include generating for display, highlighting an object, visually enhancing an object using visual effects (e.g., borders, flashing effects, glowing effects, etc.)

The method for identifying and selecting an object further comprises: defining a focus point within the target finder area; and determining a nearest object, from the one or more list of one or more objects, to the focus point. Determining the nearest object comprises: retrieving one or more object data for each object in the determined list of one or more objects; defining a prominence area for each object, wherein a size of the prominence area is based on the one or more object data, wherein the prominence area extends outward from each object to define an outer perimeter; for each object, calculating a focus distance between the focus point to a nearest point on the outer perimeter of the prominence area; and determining the nearest object based on the calculated focus distance for each object. The size of each prominence area for each object can be adjusted such that each prominence area does not overlap with the prominence area of one or more adjacent objects. The object data may consist one or more of a health status, a character class type, a character rank, a percentage discount, a price, a match with the user profile.

Determining the nearest object may also comprise: retrieving one or more object data for each object in the determined list of one or more objects; for each object, determining a focus distance between the focus point and the object; defining a prominence score for each object based on the one or more object data; calculating a focus score based on the focus distance and the prominence score; and determining the nearest object based on the focus score of each object.

In yet another aspect, a system for the identification and selection of an object is presented. The system comprises a user device configured to send information to a server; and a server configured to: determine a location of a user based on the information received from the user device; determine a list of one or more objects near the location of the user; and send the list of one or more objects to the user device.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

Overview

Figure 1:
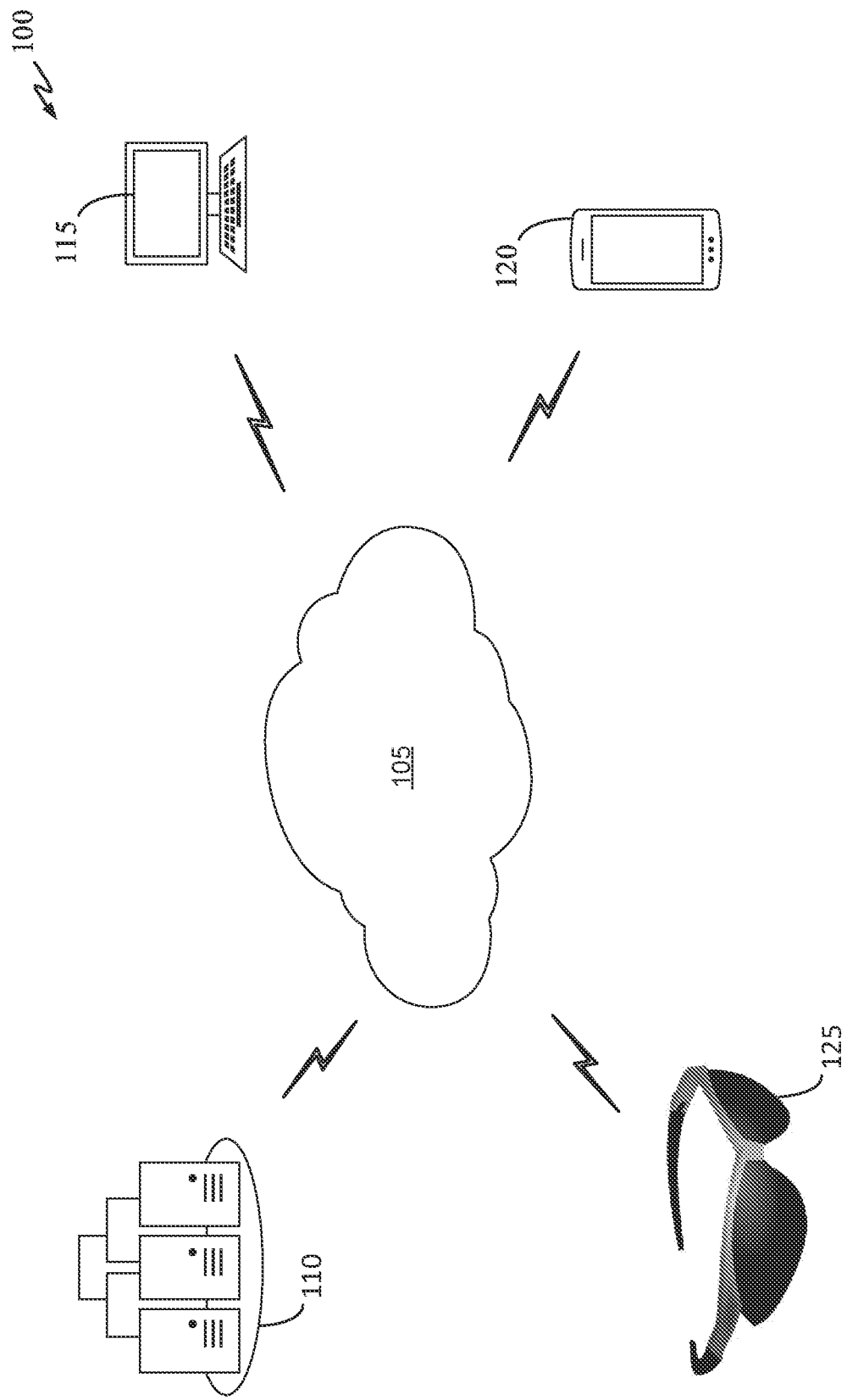
FIG. 1 illustrates an exemplary environment in accordance with some embodiments of the disclosure.

FIG. 1 illustrates an example environment 100 that includes a network 105, a server 110, a client or user device 115, 120, and 125. Server 110 may be a massively multi-player online game (MMOG) server that hosts online games such as League of Legends. Alternatively, server 110 may be a merchant server that hosts augmented reality and/or virtual shopping experiences for its in-store and online customers. User device 115 may be a desktop computer, a laptop, or other computing devices. User device 120 may be a tablet, mobile phone, or other portable computing devices (e.g., portable gaming system). User device 125 may be an augmented reality and/or virtual reality headset or glasses. Each of user devices 115, 120, and 125 includes a communication module that enables the device to communicate with game or merchant server 110 via network 105.

Server 110 may include a plurality of server systems operating on a plurality of server machines communicatively coupled to each other via network 105 and/or a secure virtual private network (not shown). The plurality of server systems may be located at various data/server center around the world. Each server may include a processor, memory, an operating system, an input/output interface and network interface all known in the art. Each server may also include various databases that provide in-game data, user data, sales data, product data, market data, demographics, etc. Each server may also include various modules—as described below—that provide graphical user interface and an improved object identification and selection functionalities in accordance with some embodiments of the disclosure.

Figure 2A:
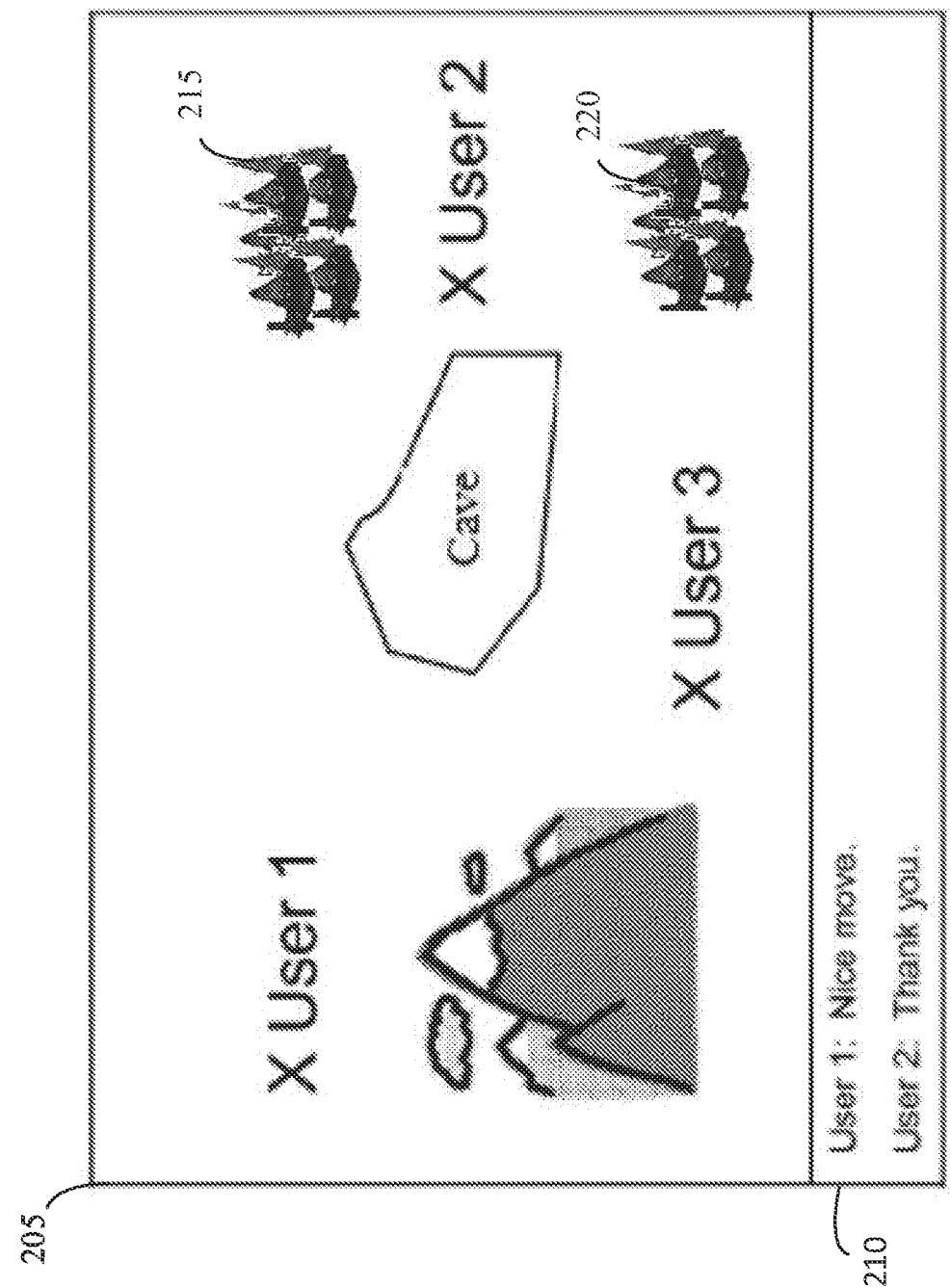
FIG. 2A illustrates an exemplary game environment.

Turning first to the MMOG environment, a game client for an online game such as League of Legends may be installed on a user personal computing devices (e.g., computer 115 and tablet 120) to establish a game session over network 105. League of Legends is a session-based multi-player online battle-arena game where rival teams compete against one another for victory on highly stylized battlefields and landscapes. FIG. 2A illustrates an example user interface 200 of a game client operating on a client device (e.g., computer 115, tablet 120, headset 125). In an MMOG such as League of Legends, each user is generally represented by a personalized graphical avatar in the user interface, also referred to as "champion," (shown as "X" in this example). User interface 200 may show the logical position of one user's avatar, X User 1, relative to another, X User 2 and X User 3 within a virtual environment 205. In-game generated non-player characters (NPCs) 215 and 220 may also be generated to programmatically engage one or more of the user avatars. User interface 200 may also include a chat interface 210 that enables participating users to communicate with one another beyond interactions with their avatars (Xs).

Figure 2B:
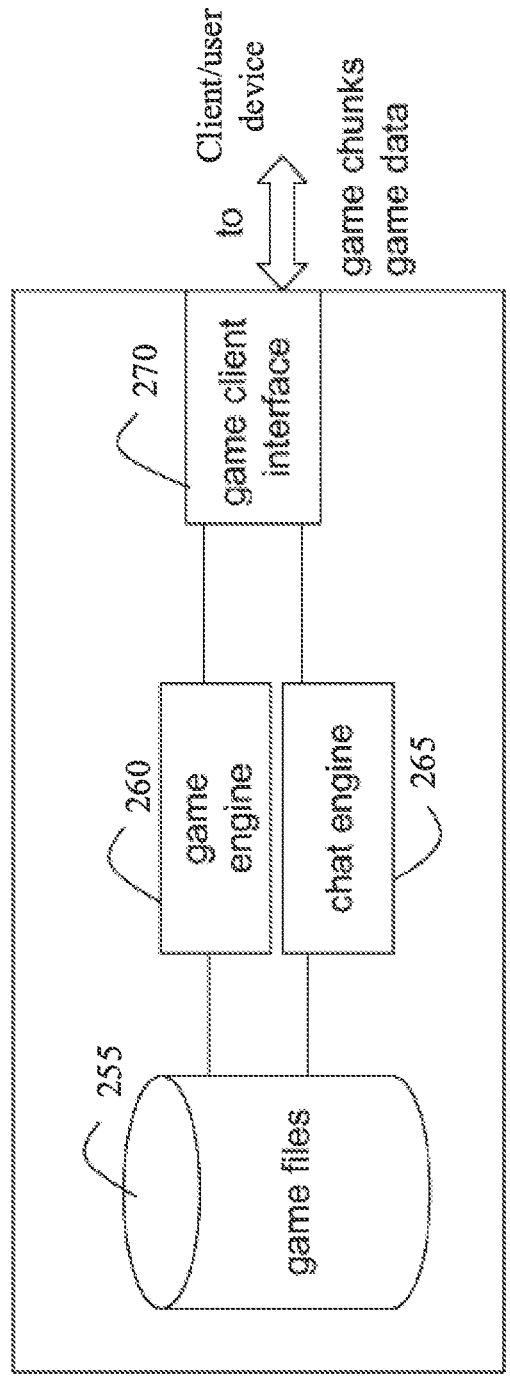
FIG. 2B illustrates an example MMOG game system.

FIG. 2B illustrates an exemplary server system 250 that includes a game database 255, a game engine 260, a chat engine 265, and a game-client interface 270. Game server system 110 provides the game interaction with user device 110 (or user devices 120 and 125) via game client interface 270, which is generally an application interface known in the art accessible over network 105 by user device 110. In server system 250, game engine 260 manages the interaction between the plurality of users and in-game play using data from game database 255, which may contain character profiles, user profiles, real-time character and user data (e.g. health, stamina, class, rank, etc.)

Chat engine 265 enables the various users in a game session to communicate with each other via text messages. Audio, pictures, and multimedia may also be exchanged with the chat engine 265. Both the game engine 260 interactions as well as the chat messages exchanged can be recorded and stored in a game files database 255. This enables, among other things, replay and history analysis by not only the users but also the administrator and other systems as will be described below.

Referring again to FIG. 2A, virtual environment 205 includes NPC groups 215 and 220, each of which is a group of minions that is advancing toward the position of user 2 to engage in a combat with user 2. The minions in each group of NPCs may be in a tight formation and may surround a boss NPC in order to project the boss NPC. In this scenario, it can be very challenging for user 2 to specifically target the boss NPC in the middle of the tight formation. It can be particularly challenging if the human user of user 2 is using a touchscreen based user interface or other type of user interface where selecting an object with pinpoint accuracy may be challenging (e.g., a system with visual selection via eye tracking or hand-gesturing interface). Additionally, the minions may overlap each other and may also obscure the boss NPC from view. Accordingly, to assist the user in selecting a specific target and/or staying on a specific target, a method and system for object identification and/or selection are provided below.

Figure 2C:
FIGS. 2C-D illustrate example shopping environments.
Figure 2D:

We now turn to a virtual shopping and/or augmented reality shopping environment where the same challenges of identifying and selecting an object exist. FIG. 2C illustrates an example virtual shopping environment 280 of a food aisle in a grocery store. FIG. 2D illustrates an example augmented reality shopping environment 290 of a clothes aisle in a department (clothing) store. In virtual environment 280, it can be very difficult for a user to select an object such as a particular baking soda box in the middle of a shelf next to bunch of other similar sized and/or colored boxes. From the user perspective, everything may look similar or the same when looking through a display of the user interface. Even if the user is using a fairly accurate selection tool such as a mouse, it can still be very difficult select a product of interest when everything is tightly displayed together. Similarly, in an augmented reality environment 290, it can be very difficult for a user to quickly identify an item of interest and to select that particular item when the products are displayed closely together and may even overlapped each other. For example, the item of interest may be a blue t-shirt in the middle of the rack behind several other items. Thus, without the present method and system for object identification and selection, it can be very difficult (if not impossible) to quickly identify that the blue t-shirt is an item of interest based on the user's profile and to automatically present it to the user via the user interface.

Object Identification & Selection

Figure 3:
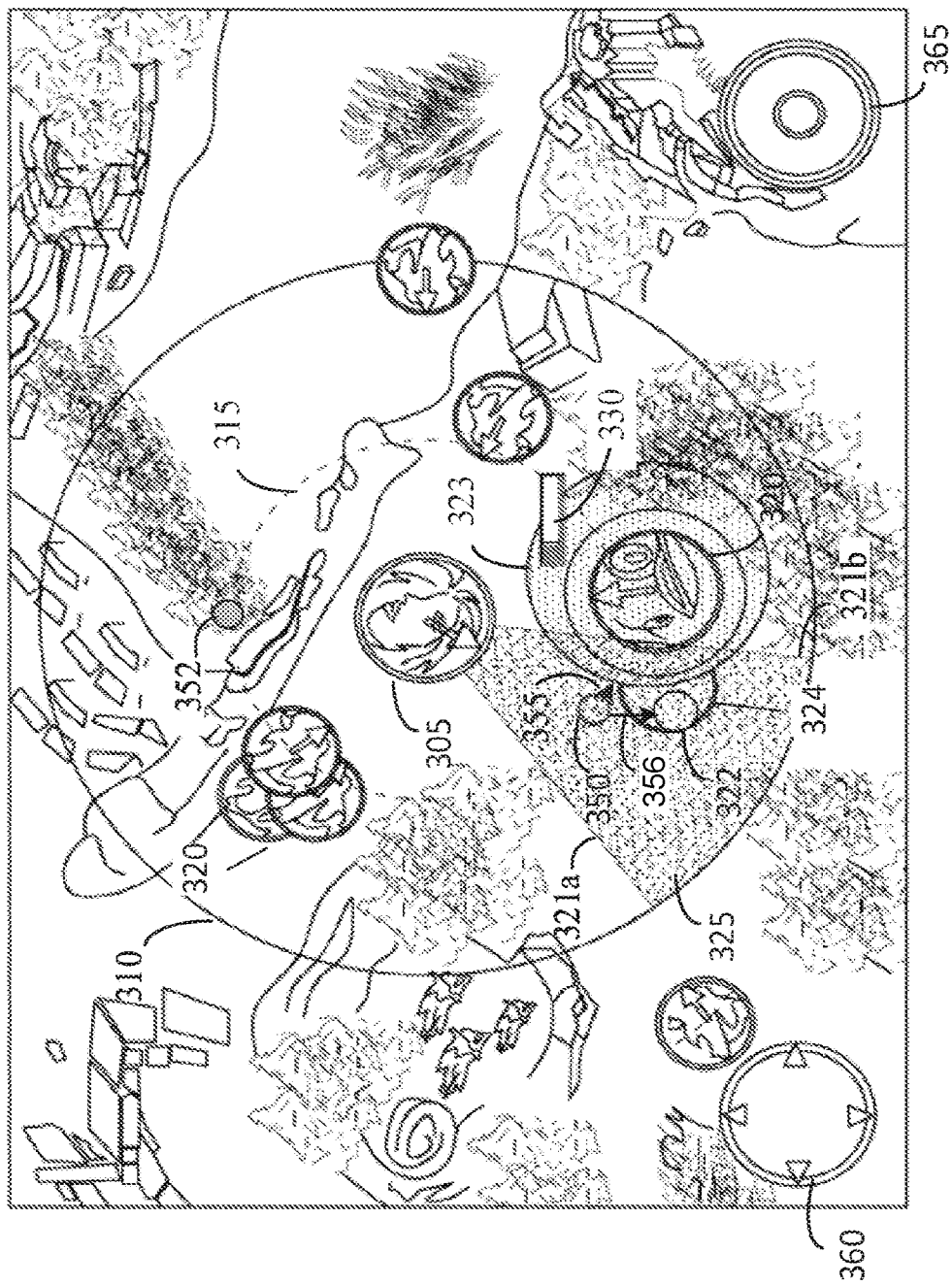
FIGS. 3, 4A-4B, 5, and 6 illustrate example user interfaces for identifying and selecting an object in accordance with some embodiments of the disclosure.

FIG. 3 illustrates a user interface 300 in a virtual game environment in accordance with some embodiments of the disclosure. User interface 300 may be a touchscreen display on a personal computing device such as a tablet, a mobile phone, a virtual reality headset, or a portable gaming system. User interface 300 includes a champion 305, a maximum target range 310, a mid-point target range 315, a target finder area 325, a focus point 350, a directional pad portion 360, and a rotation pad portion 365. Maximum target range 310 may be determined based on the profile of champion 305 such as the character class and/or a weapon type. For example, if champion 305 is a warrior that uses only a sword, then target range 310 may be shorter as compared to the target range for a ranger class character that can use a bow for a long-distance attack. Mid-point target range 315 is approximately half the distance of maximum target range 310. A circle representing the maximum attack area may be shown on user interface 300. Similarly, mid-point target range 315 may be shown or may be made invisible on user interface 300.

Target finder area 325 is in front of champion 305. The coverage area of target finder area 325 may be defined by maximum attack range 310 and side-boundaries 321a and 321b, both of which may originate from the same point of origin (at champion 305). The target finder angle between side boundaries 321a and 321b may depend on the user's character profile. For example, target finder angle may be wide if the user's character is a warrior class. Alternatively, the target finder angle may be narrow if the user is a ranger class, for example. Although the shape of target finder area 325 is shown to have a wedge shape, other shapes could be used while remaining within the scope of this disclosure. For example, target finder area may have a trapezoidal, cylindrical, or conical shape. Target finder area 325 may be defined within a 2-D space or a 3-D space. In the 3-D embodiment, target finder area 325 may have height variable that may also depend on the user and/or the user controlled champion/character's profile. In the case of a wizard class character, for example, the height value for target finder area 325 may be very high (e.g., one or more kilometers high) as wizard may cast long distance attack spells (e.g., lightning attack) or summon creatures from the sky. In another example, the height value for target finder area 325 of a warrior class may be between 3-4 meters. In some embodiments, the user may define the dimensions of target finder area 325.

The default location of focus point 350 can be at midpoint target range 315 and in the middle axis of target finder 325. In a 3D space, focus point 350 may have a default height at the eye level of the user or the user's character. The x, y, and z location of focus point 350 may also depend on the profile of the user and/or the user's controlled character. In some embodiment, the default location of focus point 350 may be defined by the user. In some embodiments, the user may move focus point 350 to a new location at 350 by selecting focus point 350 and moving it to the new location. Once the focus point is moved to location 350, target finder area 325 also moves to the new location. To perform a move of focus point 350 on a touchscreen interface, the user may press and hold focus point 350 and drag it to a new location. Once at the new location, the user may release (i.e., lift the selection finger) the touchscreen interface to complete the move. If however, the user does not release the touchscreen interface and moves focus point 350 back to its original location, then move is not completed (this is considered to be a simulated move). To perform a simulated move, the user may press and hold focus point 350 and drag it to a new location without releasing the touchscreen (or selection button such as a mouse button). During this simulated movement of focus point 350, the client device may reposition and display target finder area 325 to the new simulated position (i.e., location 352). Client device may also determine and present by displaying and highlighting potential new targets within the target finder area at the simulated position. However, it is important to note that during the simulated move, none of the potential new targets is actually selected. Those potential new targets are only presented and/or highlighted to show which objects (e.g., minions and boss NPC) will be the new target once the actual move is performed, which does not occur until the touchscreen (or mouse button) is released. In other words, during a simulated move to location 352, the boss NPC 320 will remain selected and champion 305 will continue to attack boss NPC 320 until an actual move to a new location takes place and a different nearest object to focus point 350 is selected.

The user may also move target finder area 325 (and focus point 350) simply by moving the champion/character in the game environment by interacting with d-pad portion 360 and/or rotation pad portion 365. Target finder area 325 and focus point 350 may automatically move and adjust to match with the changing field of view as the user and/or the user's character moves (e.g., by moving or rotating using d-pad 360 and/or rotation pad 365). For example, the user may cause the champion to look up by manipulating rotation pad 365, which will also cause the position of area target area 325 and focus point 350 to move in order to match the champion's new field of view.

In some embodiments, the client device (e.g., computer 115, headset 125) includes an object detection module (not shown) for determining a list of objects within the coverage area of target finder area 325 and which object from the list of objects is the nearest to focus point 350.

To find the nearest NPC mob, the client device may use a distance scoring system as described below with respect to FIGS. 4A-4B. For example, distance from the center of mob 324 to focus point 350 is closer than the distance from the center of mob 320 to focus point 350. However, because mob 320 is a boss mob, it receives a distance bonus that essentially reduces the overall distance score to focus point 350. Additionally, boss mob 320 is low on health as indicated by health indicator 330, thus mob 320 receives an additional distance bonus due to its health status.

In some embodiments, a distance bonus may be assigned to various object characteristics such as health level, class, rank, attack power, experiences, etc. For example, if a NPC is a wizard class and is also a boss character, then the wizard-boss-NPC will receive distance bonuses for being a wizard class, a boss, and a character having high attack power. This essentially reduces the actual distance between the NPC wizard and focus point 350. Generally, in gaming strategy, the most powerful mob should be attacked first, particularly if the mob can perform high-powered attacks. The distance scoring system provides an easy way to target and to stay on target a mob of interest such as a boss mob or a mob with very low health. In this example, after the distance bonuses of mob 320 are accounted for, its distance score is lower than mob 324. The lower the distance score, the closer the mob is to focus point 350. If two or more mobs have a negative distance score, then the most negative score is considered to be the nearest mob to focus point 450. Once a mob is determined to be the nearest mob, it is automatically selected to receive an action (e.g., attack, block, assist, heal, etc.) as specified by the user. It should be noted that the same concept can be applied to other human controlled characters in a group in order to assist and/or heal a team member.

In some embodiments, the nearest mob is determined based on a prominence area of each mob and the distance from focus point 350 to the nearest perimeter point of the prominence area. Similar to a distance bonus, the prominence area may depend on various object's characteristics such as rank, class type, health level, attack power, reputation, experiences, healing skills, etc. Rather than a distance bonus, each of these characteristics can increase the area of the prominence area by increasing its radius, which starts at the center origin of each mob. For example, a mob with low health may be given a prominence bonus to increase the radius of its prominence area. Between two similar mobs, assuming all things being equal (e.g., equal distance to champion 305, similar experiences, same class, etc.) except that one mob has a lower health status than another mob, the mob with the lower health status will have a larger prominence area. In this way, the mob with the lower health can be automatically targeted instead of the mob with full health. In some embodiments, the user can adjust, assign, and/or prioritize the amount of bonus for the prominence area bonus (and/or distance bonus) to certain object's characteristics. For example, a larger bonus may be assigned to health status or healing skills than to a bonus for reputation.

In another example, mobs 320 and 324 may be of the same class (e.g., a warrior); however, mob 320 is a boss mob. This means it will receive a prominence bonus and that its prominence area 323 will be larger than the prominence area 322 of mob 324. The nearest mob from focus point 450 is determined by calculating the distance between focus point 350 to the nearest point/edge of the prominence area. In user interface 300, mob 324 has a prominence area 322 and mob 320 has a prominence area 323, which is considerably larger than area 322 because of one or more prominence bonuses assigned to mob 320. In calculating the nearest distance to focus point 450, distances 355 and 356 are measured and compared. Distance 350 is the distance from focus point 350 to the nearest edge of prominence area 322 of mob 324. Distance 355 is the distance from focus point 350 to the nearest edge of prominence area 323 of mob 320. As shown, distance 355 is shorter than distance 356. Accordingly, mob 320 is considered to be the nearest mob even though it is actually farther away than mob 324.

In some embodiments, the prominence areas of adjacent mobs are adjusted so that they do not overlap one another. This is to prevent a prominence area of a major mob from completely encompassing a prominence area of another adjacent minor mob. If this occurs, it may be impossible to select the minor mob as it is completely within the prominence area of the major mob. In some embodiments, after all of the prominence bonuses are assigned to mobs within target area finder 325, any overlapping prominence areas will be adjusted until they are no longer overlapping. In some embodiments, each of the overlapping prominence areas can be reduced by an equal ratio or factor. Alternatively, only the prominence area of a minor mob (a mob having a smaller prominence area) will be adjusted. By default, user interface 300 only calculates the focus distance (distance from focus point 350 to the nearest point of each prominence area) for mobs located within target finder area 325. Alternatively, the focus distance for each NPC mob within the mid-point target range will be calculated. In some embodiments, if a non-selected mob not within target finder area 325 is closer to the user's avatar (e.g., champion 305) location than the nearest mob to focus point 350, then the user may be alerted and/or the non-selected mob may be highlighted in order to warn the user of the imminent danger.

Figure 4A:
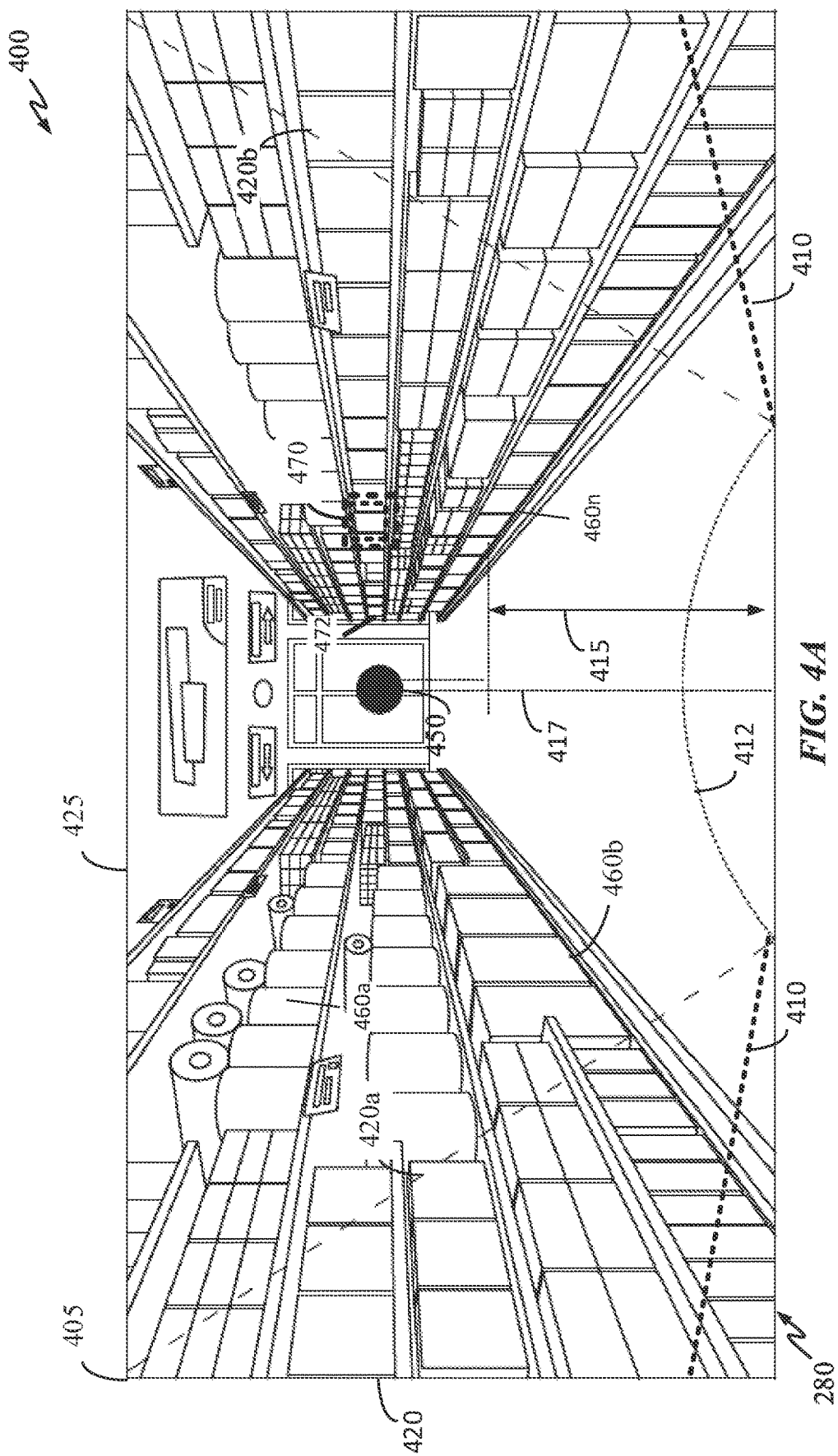

FIG. 4A illustrates a user interface 400 operating in environment 280 in accordance with some embodiments of the disclosure. User interface 400 may reside on a client device (e.g., computer 115, tablet 120, and headset 125), which may be in communication with a merchant server (e.g., server 110). Environment 280 may be virtually generated similar to an in-game environment. Alternatively, environment 280 may be an augmented reality environment in which user interface 400 augments or enhances a real environment with overlaying graphics and information. In a virtual environment, a client device such as computer 115 connects with server 110 to exchange information and generates a virtual environment and overlaying graphics using the information received from server 110. In an augmented reality scenario, a client device such as headset 125 connects and exchanges data with server 110 and then generates overlaying graphics and information using the data received from server 110. User interface 400 may be a touchscreen display on a computing device or a display of a headset or glasses.

User interface 400 includes a field of view 405 defined by the perimeter of user interface 400. Field of view 405 may additionally be defined by dashed lines 410 and 412, which may be visible to the user in user interface 400. In some embodiments, dashed line 412 is not present and field of view 405 is defined by the perimeter of and dashed lines 410. The size of field of view 405 may be adjusted based on the user's preference or may be automatically adjusted based on, but not limited to, the user's profile such as age, shopping habits, playing patterns, etc.

User interface 400 also includes a target finder area 425, which is defined by lines 420a and 420b. Target finder 425 is the area between lines 420a and 420b. Both lines 420a and 420b may be visible to the user in user interface 400. The size, shape, and range of target finder 425 may also be based on the user's preference and/or may be automatically adjusted based on the user's profile such as age, shopping habits, playing patterns, spending power, income bracket, credit line, credit history, etc. For example, an elder person may have a shorter range than a young adult due to a combination of age and spending habits. In some embodiments, target finder 425 is located approximately in the middle of field of view 405 and may exhibit a trapezoidal shape with the distal side longer than the proximal side (with respect to the user's avatar position).

In user interface 400, target finder area 425 moves along with field of view 405. In other words, when the user's avatar turns and faces a different direction, both field of view 405 and target finder area 425 move to face the new direction. User interface may also include a focus point 450, which has a default location in the approximate center of target finder area 425. Focus point 450 also moves along with target finder area 425 as the user's avatar moves around environment 280. Focus point 450 may be set at a default distance 415 away from the user's avatar location. In environment 280, distance 415 may be half the distance of distance 417, which stretches the entire length of the aisle. In some embodiments, the location of focus point 450 may be manually adjusted by the user to bring it closer or farther away from the user's avatar origin. Focus point 450 helps user interface 400 to automatically select or highlight an object within target finder area 425, more detail on this object selection process is provided below.

In some embodiments, only objects within target finder area 425 may be presented to the user on user interface 400. Presenting an object may include one or more of generating an object for display, selecting an object, highlighting an object, and enhancing an object with some form of visual effects. Once the object is displayed, selected, highlighted, or enhanced, the user may perform an action (e.g., purchase, save on shopping list, obtain more information, attack, heal, communicate, assist, etc.) on the object.

In some embodiments, in a virtual shopping environment, only objects within target finder area 425 are generated for display. Objects outside of target finder area 425 may be invisible to the user or may be represented by a generic or low-detailed graphic such as a box or other suitable shape that closely approximate the true shape of the object. Only displaying objects within target finder area 425 has a couple of advantages. First, it reduces the required processing power of the client device as all objects in field of view 405 do not need to be displayed. This also reduces the amount of information needed to be exchanged between server 110 and the client device. Alternatively, objects within target finder area 425 may be displayed with high detail and resolution while objects outside of target finder area 425 may be displayed with low detail and resolution. A second advantage is to increase the user focus by limiting the display of objects outside of target finder area 425. In this way, the user may better focus on objects presented by user interface 400 inside of target finder area 425.

As shown in FIG. 4A, a plurality of objects are presented in target finder area 425 such as objects 460a, 460b, and 460n. One or more objects displayed within target finder area 425 may be automatically selected or highlighted. A selected object may be visually distinguished from other non-selected objects using visual effects such as highlight the object and/or making the object flashes or glows. In some embodiments, only one object within target finder area is automatically selected or highlighted. Once the object/item is automatically selected, the user may perform an action on the selected item such as request for more information (e.g., price, expiration date, price comparison with other merchants, etc.) save the item on a favorite list, purchase the item, etc.

As previously alluded to, focus point 450 helps client device 125 to automatically select or highlight an object. This may be accomplished by determining a distance from the object to focus point 450. In some embodiments, an object that is nearest to focus point 450 is automatically highlighted or selected. The distances between focus point 450 and to various objects may be determined using information received from server 110 or by a distance calculation module that analyzes the pixel count in combination with the spatial relationship between each object and focus point 450. For example, object 472 may have a smaller pixel count than object 470. However, its spatial location is toward the end of the aisle away from the user's avatar location and focus point 450. Accordingly, object 470 has a smaller distance score than object 472. Once object 470 is determined to have the smallest distance (or the smallest distance score), it may be automatically selected or highlighted in user interface 400. Client device 125 may also request for more information on object 470 from server 110 or may search the Internet for more information on object 470. Any additional information received on object 470 (e.g., price, expiration date, price comparison with other merchants, etc.) may be automatically displayed in user interface 400. Alternatively, the additional information received may be emailed, texted, or presented verbally to the user of the client device.

In some embodiments, the object being selected and/or highlighted is based on a combination of the distance score and the user profile. For example, object 470 may be the second nearest object to focus point 450 but is automatically selected (as if it is the nearest object) because the object appears on the user's favorite list or was previously purchased by the user. In some embodiments, if an object is on the user's favorite list or matches with some relevant information in the user's profile, the object may receive a distance bonus that would reduce the object's overall distance score. Alternatively, if an object is on the user's favorite list or to buy list, then the object will be highlighted regardless of its distance to focus point 450 as long as it is within target finder area 425. In this embodiment, more than one object may be selected or highlighted at the same time.

In some embodiments, a distance bonus may be assigned to various object characteristics/parameters such as percentage discount, a trending factor, endorsement, product reviews, friends recommendation, etc. For example, if a product is trending, it may receive a distance bonus of negative 10, and an additional negative 10 points if it is well reviewed by friends or by other consumers. The distance bonus would effectively reduce the total distance from the object to focus point 450 by reducing the overall distance score. The lower the score, the closer the object is to focus point 450. In theory, one or more objects may have a negative distance score. In this case, the object with the most negative score is deemed to be the nearest/nearest object to focus point 450. Alternatively, the distance score system could be reversed where a positive score is considered to be closer to focus point 450. In a virtual environment, the object deemed to be the nearest to focus point 450 may be generated for display with one or more of the visual effects such as with the object highlighted, flashing, or glowing.

Figure 4B:
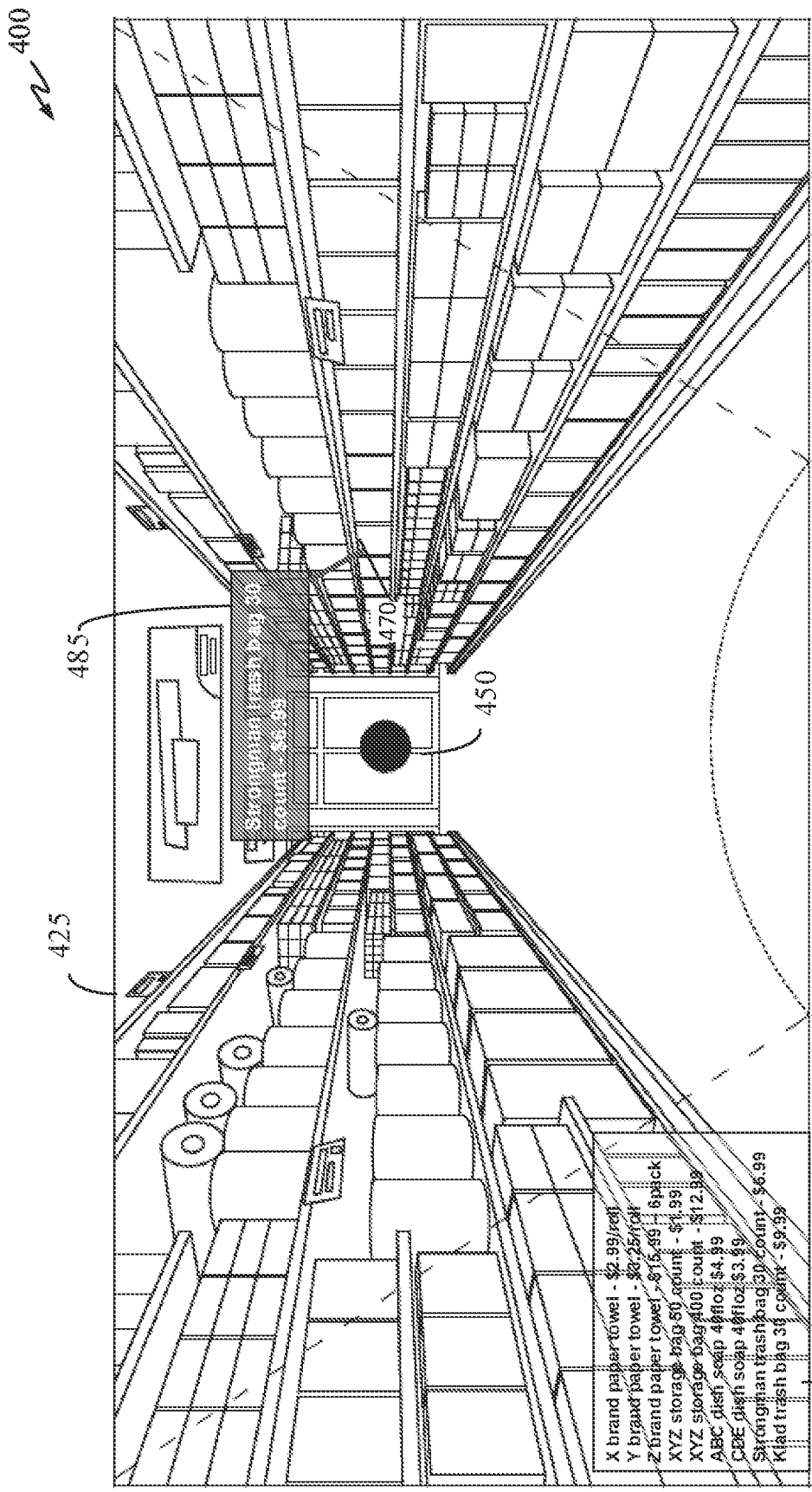

FIG. 4B illustrates user interface 400 having overlay portions 480 and 485 in accordance with some embodiments of the disclosure. Overlay portion 480 may present information received from server 110 or other sources on the Internet relating to one or more objects within target finder area 425. Information relating to the one or more objects may be referred to herein as object data. As the user moves around the store, the object data shown in overlay portion 480 are constantly updated to reflect the different objects coming in and out of target finder area 425. The object data may be requested by client device 125 or may be automatically sent to client device 125 by server 110. In some embodiments, once client device 125 enters an area, server 110 sends the object data of all objects around client device 125 location. Client device 125 then filters the received object data to determine which object data to show on overlay portion 480 based on the coverage of target finder area 425. Alternatively, client device 125 may send the coverage area information of target finder area 425 to server 110, which then sends the object data to client device 125 based on the coverage area information received from client device 125. Overlay portion 480 may display object data such as brand, price, product reviews, weight and measure, price comparison with other merchants, expiration date, available discount, etc. Overlay portion 480 may be displayed to the side of user interface 400 and may be semi-transparent.

In some embodiments, user interface 400 also includes a main-object overlay portion 485 that displays the object data of the nearest object (e.g., object 470) to focus point 450. In this way, the object data for object 470 is readily accessible by the user. Similar to overlay portion 480, overlay portion 485 may display object data such as brand, price, expiration date, available discount, etc. Overlay portion 485 may be displayed inside of target finder area 425. Alternatively, overlay portion 485 may be displayed near the perimeter of user interface 400.

In an augmented reality scenario, object 470 may be a real object (e.g., a cereal box) and may be presented to the user as the nearest object using visual effects such as a combination of highlighting, flashing, and glowing effects around or overlaying object 470.

Figure 5:
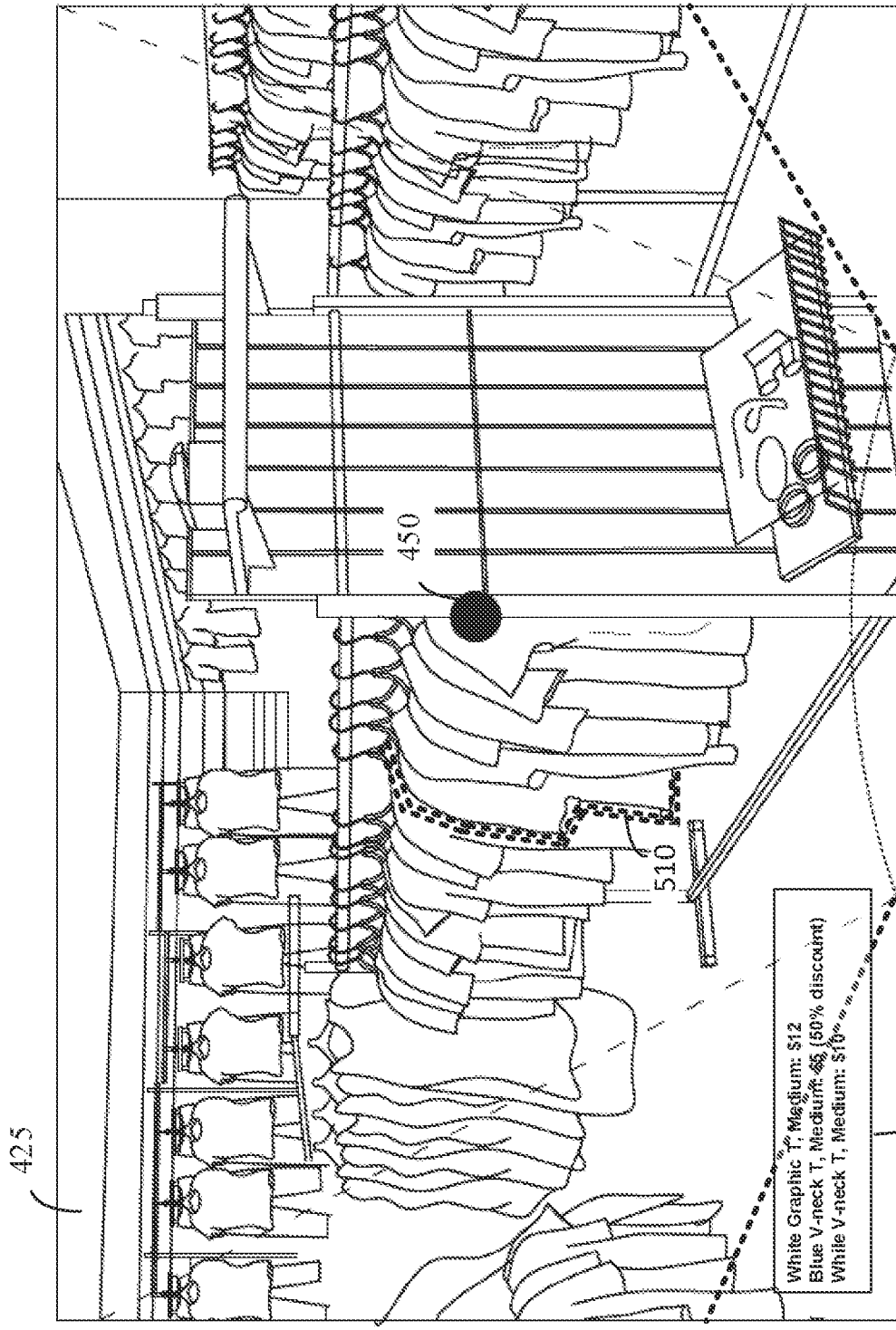

FIG. 5 illustrates an example of real shopping environment 290 being augmented with overlay graphics and information by a portable client device having user interface 400 in accordance with some embodiments of the disclosure. User interface 400 may be operating on a personal computing device such as headset 125 or a pair of glasses where user interface 400 may be projected onto the surface of one of the glasses. In this embodiment, environment 290 is being augmented with target finder area 425 and focus point 450. Additionally, user interface 400 may augment environment 290 with overlay portion 480 that displays the object data of one or more clothing items within target finder area 425. As shown in overlay portion 480, the object data for only 3 items are displayed even though there a lot more objects in target finder area 425. The display of this reduced data set is purposeful in order to better focus the user to what is actually important or of interest to the user. In this scenario, the client device may cross reference the information in the user profile with the object data (for each object where data is available) to determine whether the object is relevant to the user. For example, the user profile may indicate that the user is sized medium and likes graphic T-shirts and V-neck T-shirts. Given this information, the user device may filter all objects within target finder area 425 to find and only present (e.g., highlight, enhanced, etc.) objects that match with the size and style preference as indicated by the user profile. In this way, the user's shopping experience is greatly enhanced and efficient. One or more objects in target finder area 425 that match with a user profile parameter may be listed in overlay portion 480 and may additionally be presented by means of using visual effects such as object 510, which is outlined and/or highlighted on the display of user interface 400.

Object data for objects in target finder area 425 may be obtained from merchant server 110, which may contain object data for products in the merchant store. Server 110 may determine the location of client device 125 using the location information received from the client device. Server 110 may then send to client device 125 the object data for one or more products around the location of client device 125. In this way, client device 125 can be aware of all products near the user. As the user moves around the store, target finder area 425 and focus point 450 also move, which causes client device 125 to re-determine which objects are within the new coverage area of target finder area 425. Client device 125 also re-determines the nearest object to focus point 450 at the new location and updates overlay portion 480 and/or portion 485 accordingly. As previously mentioned, focus point 450 may be moved by the user to a different location within the user's field of view. For example, the user may move focus point 450 to the upper-right corner of the field of view. This will cause client device 125 to re-determine the nearest object to the new location of focus point 450.

Figure 6:
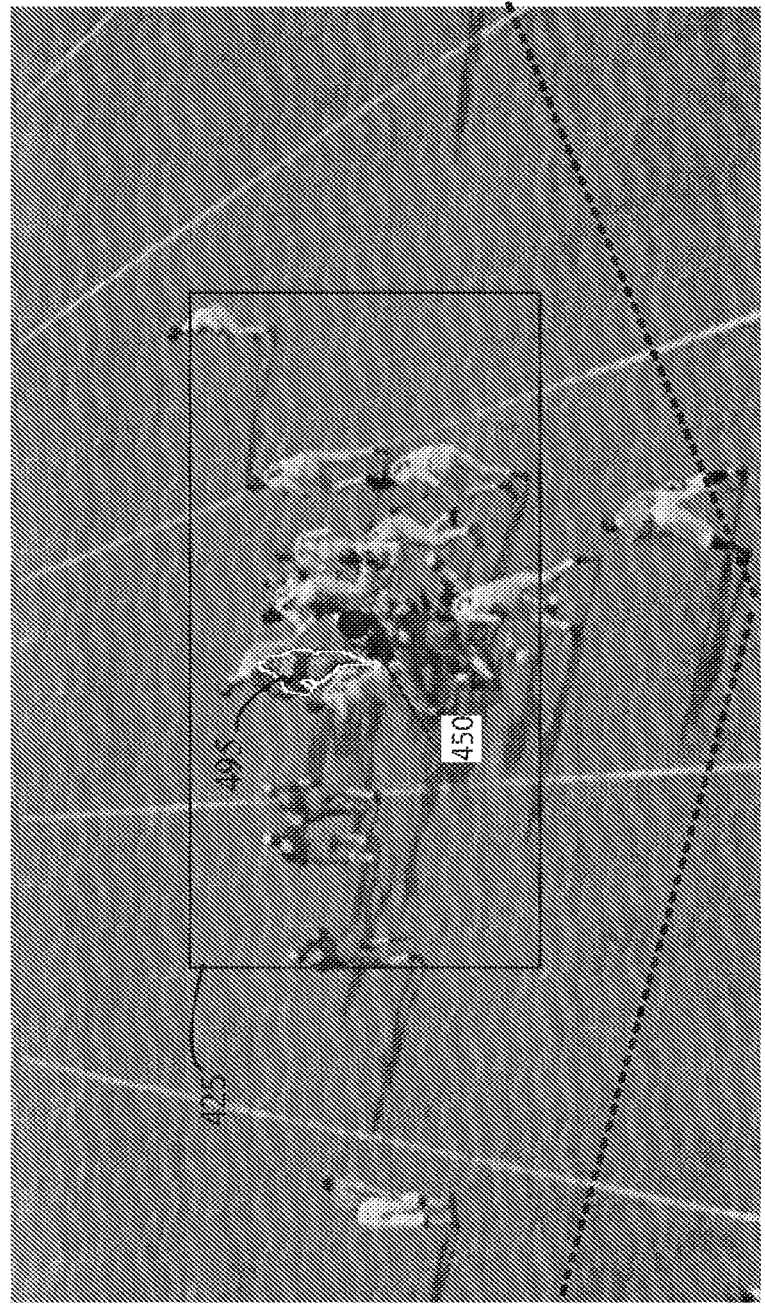

FIG. 6 illustrates a user interface 490 in accordance with some embodiments of the disclosure. User interface 490 is similar to user interface 400 and may have one or more features of user interface 400 as described in FIGS. 4A and 4B. User interface 490 can have a rectangular shaped target finder area 425. As previously mentioned, target finder area 425 may have various shape such as a wedge, a rectangle, a square, a circle, a trapezoid, etc. In this embodiment, a rectangular shape is more appropriate since the game environment is also rectangular. In a baseball game, target finder area 425 may have a wedge or pie shape to better fit the playing field. In some embodiments, the user may change the shape and size of target area 425. Changing the shape and size of target area 425 will affect the determination of which objects falling within target area 425.

User interface 490 may be implemented on a virtual or augmented reality device (e.g., augmented glasses or headset), on a computer screen, a television, or a mobile device such as a tablet. In the case of a tablet, it can be seen that selecting and following a player can be difficult given that the players constantly move and overlap each other. Thus, to assist the user in automatically selecting and following a target of interest, user interface 490 may automatically select and present a player to the user based on one or more of the user profile, the player profile, in-game statistics, or a combination thereof. For example, a player 495 may be highlighted because player 495 is on the user's fantasy football team or is flagged as the user's favorite player. User interface 490 may also present player 495 because the player currently has the ball. In this way, the user may better follow where the ball is at any time. In another example, user interface 400 may highlight player 495 because the player has one of the highest in-game statistics such as rushing yardage (over 100 yards), or have successfully received 5 passes, etc. In some embodiments, user interface 400 may calculate the distance between each object within target finder area 425 and focus point 450. Each player may be given a distance score that can be adjusted by a distance bonus which may be based on the user's profile, the football player's profile, in game statistics, or a combination thereof. For example, player 495 may receive a bonus score for being the current ball carrier and for being on the user's fantasy football team. Accordingly, player 495 is selected and highlighted even though there are other players closer to focus point 450.

Figure 7:
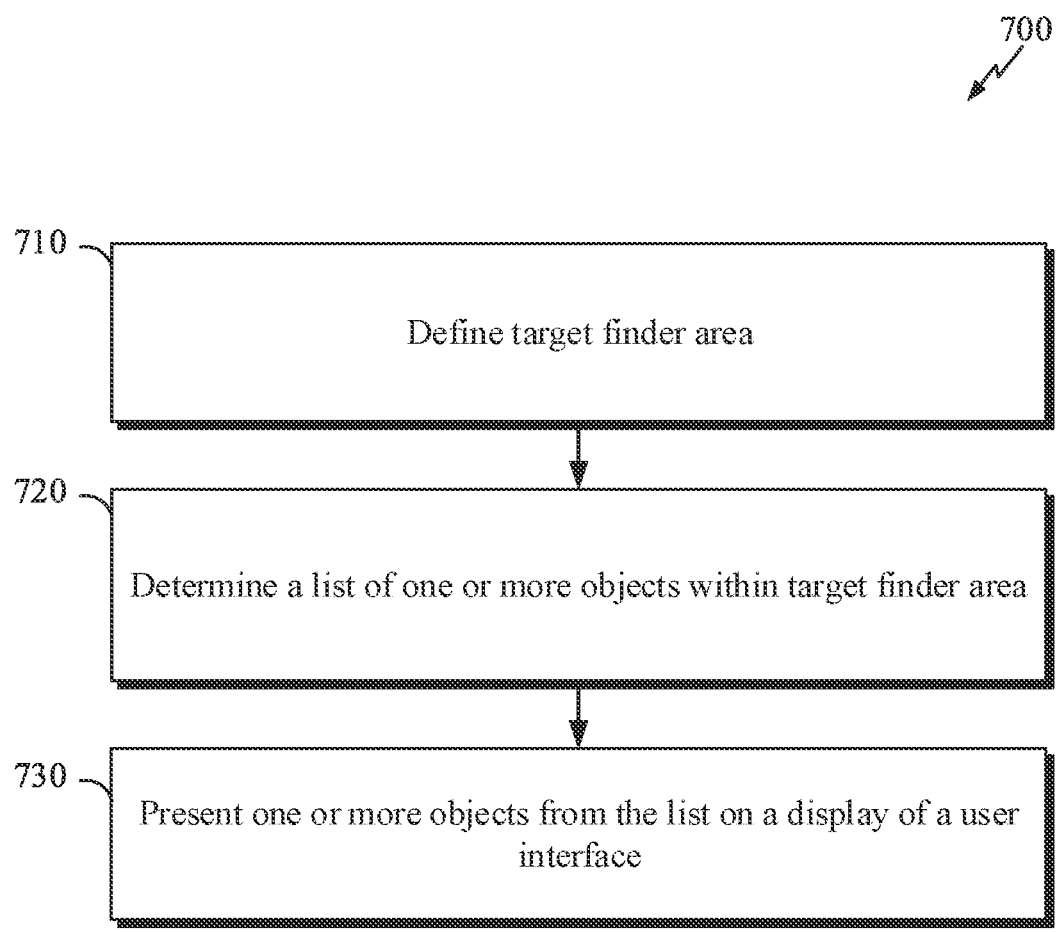
FIGS. 7-9 illustrates an exemplary process for object identification and selection in accordance with some embodiments of the disclosure.

FIG. 7 illustrates a method 700 for presenting an object on a display of a user interface in accordance with some embodiments of the disclosure. Method 700 starts at 710 where a target finder area is defined within a field of view of a user's avatar. In a first person's view, the field of view may be the entire viewing area of the user interface. In a top-down view as in FIG. 3, the field of view may be champion's 305 peripheral vision and it depends on which direction champion 305 is facing. In some embodiments, the target finder area (e.g., area 325) is within the field of view and is further defined by the maximum target range such as boundary 310 of user interface 300. The target finder area is further defined by two side-boundaries (e.g., 321a and 321b), which may be at an angle with respect to the user's avatar point of origin. The two side-boundaries may both originate from the same point of origin (e.g., user's avatar point of origin) and extend outward at an angle in the direction the user's avatar is facing. The angle between the two side-boundaries may be between 30-160 degrees and it may also depend on one or more parameters of the user profile. For example, if the user's character is a warrior, the target finder area may be short and very wide as opposed to a target finder area of an archer, which may be long and narrow. It should be noted that the maximum target range may also depend on one or more parameters (object data) of the user profile.

At 720, a list of one or more objects located within the target finder area is determined. In user interface 400, the list may include all of the products on the shelves inside of area 425. In user interface 300, the list may include all mobs fully or partially inside of area 325, which in this case includes mobs 320 and 324. The list of one or more objects inside target finder area may be made available to the user by presenting it in a portion of the user interface at 730. For example, the list of objects within target finder area 425 may be displayed in overlay portion 480. This allows the user to quickly see what in the target finder area of the user interface. Presenting an object may also include one or more of generating an object for display; highlighting an object using visual effects such as a glowing effect, a flashing effect, a border effect; and announcing an object aurally.

Figure 8:
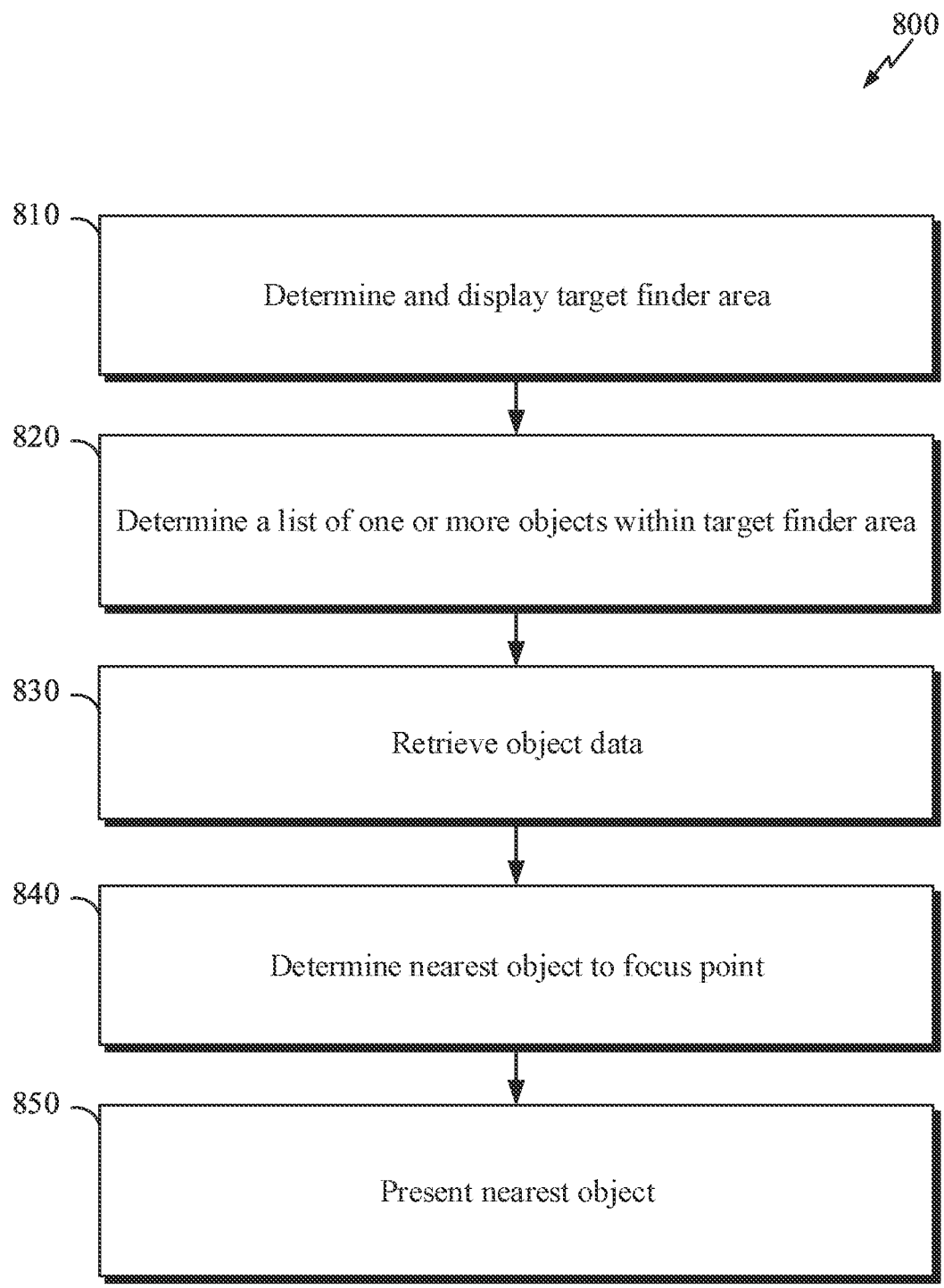

FIG. 8 illustrates a method 800 for presenting an object on a display of a user interface in accordance with some embodiments of the disclosure. Method 800 may include one or more attributes and features of method 700 as described above. At 810, a target finder area (e.g., area 425, 325) is determined and displayed on a user interface of a client device (e.g. computer 115, tablet 120, headset 125). The target finder area may be semi-transparent. The size and shape of the target finder area may be based on a parameter of the user profile. The user may also selectively turn on or off the target finder area by changing a setting in the user profile and/or the client device. At 820, a list of one or more objects within the target finder area is determined. The list of objects within the user avatar's target finder area may be provided by a server (e.g., game server 110). Alternatively, server 110 may send a list of all objects within a certain distance (e.g., field of view or an area twice the size of the field of view, etc.) from the user avatar (e.g., champion 305) to the client device. The client device may then determine which objects, from the received list of objects, are within the target finder area based on the facing direction of the avatar within the virtual environment. Alternatively, the client device may send the location and the direction facing information of the user avatar to the server. This enables the server to determine which objects in the virtual environment are within the user avatar's target finder area.

In an augmented reality environment, once the client device enters an area (e.g., a department store), the client device may send its location and/or field of view information to the merchant's server (e.g., server 110). Using the client device's location and/or field of view information, the server can determine a list of all objects around the client device's location. The server may send a list of all objects within x-distance from the client device. Alternatively, the server may send a list of all objects on a floor (e.g., the 2nd floor) or a portion of the store where the client device is located. For example, the client device may be in the shoes section. Accordingly, only a list of objects in the shoes section is sent to the client device. The server may additionally limit the list to only objects within the target finder area of the client device by using the field of view information received from the client device. Alternatively, the server may send a complete list of all objects in the vicinity of the client device and leave the task of determining which objects fall within target finder area to the client device.

The location of client device may be actively monitored by the merchant using sensors throughout the store. Alternatively, the merchant server may actively request the client device for its location and/or field of view information and continuously update and send a list of objects near the client device.

At 830, the object data for one or more objects in the list of objects determined at 820 are retrieved. In a shopping environment, the object data may include, but not limited to, an object brand, price, expiration date, manufactured date, country of origin, material composition, sale price, percentage discount, trending data, endorsement data, favorite list status, and latest news (e.g., subject of a recall, protest, award, honor, mentioned on the user's social network page, etc.). In a game environment, the object data may include, but not limited to, health status, stamina status, rank, class, experience, reputation, battle statistics, defensive statistics, offensive statistics, defensive abilities, offensive abilities, weapon types and statistics, available loot, etc. Because the object data may be comprehensive and large, only the object data for objects within the target finder area are retrieved. The client device may actively request for the object data of one or more objects within the target finder area by sending the server its location and/or field of view information. Alternatively, the sever may automatically send the object data of one or more objects within the client device's target finder area based on the client device's location and/or field of view information.

At 840, the nearest object to the client device's focus point (e.g., focus point 450 and 350) is determined. This may be accomplished using a distance scoring system, a prominence scoring system, or a combination of both. The distance scoring system includes determining a total distance score of each object within the target finder area. For each object, the distance between the focus point and the origin of an object is determined. This may be done by calculating the actual or virtual distance using real world distance data or by using pixel count on the display of the user interface. If using the pixel count method, the spatial relationship between each object and the focus point must also be considered. For example, referring to FIG. 4A, object 472 may have a smaller pixel count than object 470. However, its spatial location is toward the end of the aisle away from the user's avatar location and focus point 450. Accordingly, object 470 has a smaller focus distance score (i.e., closer to focus point 450) than object 472. The total distance score of an object may be a sum of the focus distance score and a total distance bonus of the object.

In some embodiments, a distance bonus may be granted to an object if the object appears on the user's favorite list, was previously purchased by the user, or matches with some relevant information in the user's profile. A distance bonus may be assigned to various object characteristics, but not limited to, such as percentage discount, a trending factor, endorsement, product reviews, friends recommendation, health status, stamina status, rank, class, experience, name, reputation, battle statistics, defensive statistics, offensive statistics, defensive abilities, offensive abilities, weapon types and statistics, available loot, etc. For example, if a product is trending, it may receive a distance bonus of negative 10, and an additional negative 10 points if it is well reviewed by consumers. The distance bonus would effectively reduce the total distance between an object to the focus point by reducing the object's total distance score. The lower the score, the closer the object is to the focus point. It should be noted that one or more objects may have a negative distance score. In this case, the object with the most negative score is deemed to be the nearest/nearest object to the focus point. Alternatively, the distance score system could be reversed where a positive score is considered to be closer to the focus point.

The nearest object to the focus point may also be determined using a prominence scoring system, which includes determining the prominence area of each object and the distance from the focus point to the nearest point on the perimeter of the prominence area. Similar to a distance bonus, the prominence area may depend on various object's characteristics such as rank, class type, health level, attack power, reputation, experiences, etc. Rather than a distance bonus, each object may receive a prominence bonus that would effectively increase size of the prominence area, which starts at the center origin of each object. For example, in a virtual game environment, a mob with low health may be given a prominence bonus to increase the radius of its prominence area. This may seem counter intuitive, but the main purpose of the prominence area is to identify a target of high interest. A mob having a low health status is typically considered to be a high interest target because it could be disposed of quickly to reduce the total number of enemies. In another example, between two similar and adjacent mobs, assuming all things being equal except that one mob has more experiences than other adjacent mob, the mob with more experiences will be given a larger prominence bonus and thereby will have a larger prominence area. In another example, a boss mob will receive a larger prominence bonus than a minion mob whom may receive a smaller or no bonus, depending on its health and other parameters.

After all of the prominence bonuses are calculated and assigned to each mob within the target finder area, the nearest mob to the focus point is determined by calculating the distance between the focus point to the nearest edge of the prominence area. For example, referring to FIG. 3, mob 324 has a prominence area 322 and mob 320 has a prominence area 323. Distance 360 is the distance from focus point 350 to the nearest edge of prominence area 322 of mob 324. Distance 355 is the distance from focus point 350 to the nearest edge of prominence area 323 of mob 320. Because distance 355 is shorter than distance 350, mob 320 is considered to be the nearest mob even though it may actually farther away than mob 324.

In some embodiments, the prominence areas of adjacent mobs are adjusted so that they do not overlap one another. This is to prevent a prominence area of a major mob from completely encompassing a prominence area of another adjacent minor mob. Once all the prominence bonuses are assigned to mobs within the target area finder or within a certain range to the champion (e.g., mid-point range 315), any overlapping prominence areas will be adjusted so that they do not overlap each other.

At 850, the nearest object is presented. This may include one or more of selecting the object, highlighting the object, purchasing the object, placing the object on a purchase/favorite list, performing an action (e.g., targeting, attacking, healing, assisting) on the object. In a game environment such as League of Legends, the nearest mob may be automatically selected and targeted. This enables the user to easily target a mob of interest—a boss mob, an injured mob, a mob with high attack power, etc.

Figure 9:
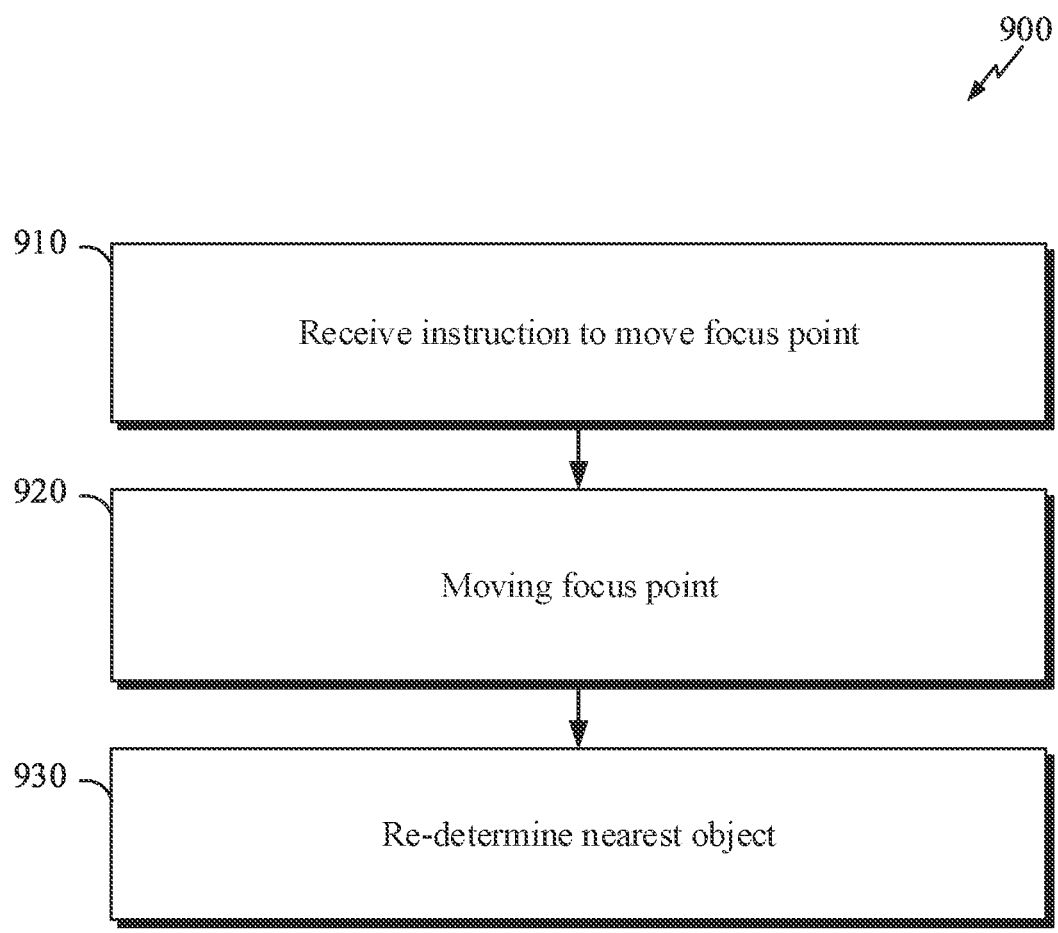

FIG. 9 illustrates a method 900 for moving a focus point in accordance with some embodiments of the disclosure. Method 900 starts at 910 where instruction to move the focus point (e.g., focus point 350) is received from the user interface (e.g., user interface 300) of the client device (e.g., computer 115, headset 125). A user may move the focus point by selecting and moving the focus point to a different location on the field of view or simply by moving the user's avatar (e.g., champion 305). The user's avatar may be moved by manipulating an on-screen control panel or joystick.

To perform a move on a touchscreen interface, the user may press and hold the focus point and drag it to a new location. Once at the new location, the user may release (i.e., lift the selection finger) the touchscreen interface to complete the move (at 920). If however, the user does not release the touchscreen interface and moves the focus point back to its original or near the original location, then move is not completed. To perform a simulated move, the user may press and hold the focus point and drag it to a new location without releasing the touchscreen (or selection button such as a mouse button). During this simulated movement of the focus point, the client device may reposition the target finder area (e.g., area 325) to the new simulated position (e.g., location 352). The client device may also simulate the new position of the target finder area and a nearest object to the new (simulated) location of the focus point. During the simulated move, a nearest object may be determined (at 930) but not selected. In other words, the user will maintain the current target during the simulate move and no new target will be selected. For example, in user interface 300, during a simulated move to location 352, the boss NPC 320 will remain selected and champion 305 will continue to attack boss NPC 320 until an actual move to a new location takes place and a different nearest object to focus point 350 is determined and selected.

Figure 10:
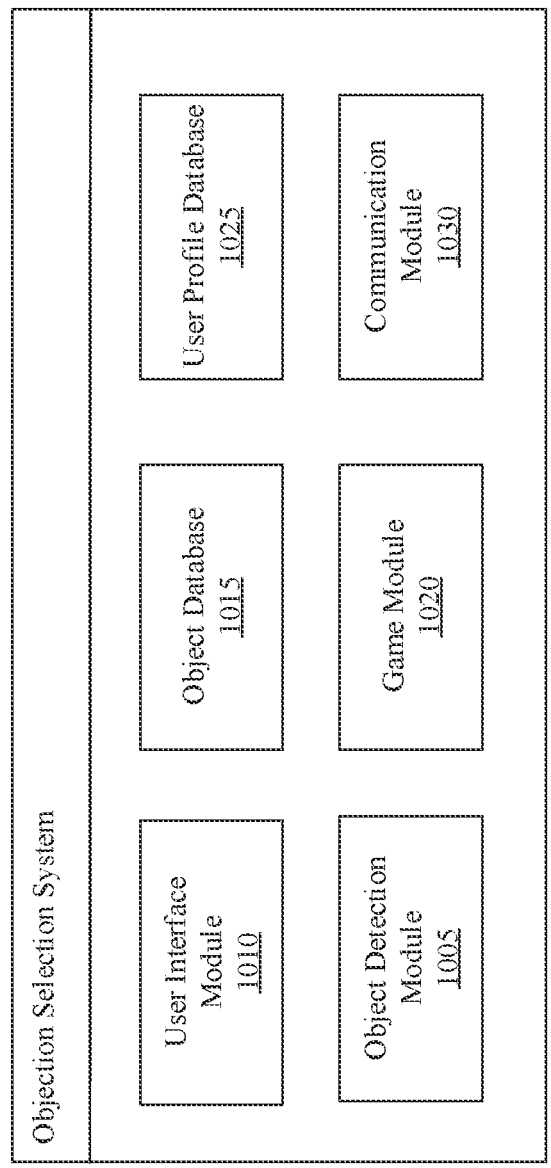
FIG. 10 is a block diagram of an exemplary object identification and selection system in accordance with some embodiments of the disclosure.

FIG. 10 illustrates a system diagram of an object selection system 1000 in accordance with some embodiments of the disclosure. System 1000 may include an object detection module 1005, user interface module 1010, an object database 1015, a game module 1020, a user database 1025, and a communication module 1030. System 1000 may reside on a single server or may be distributedly located. For example, one or more system components (e.g., 1005, 1010, 1015, etc.) of system 1000 may be distributedly located at various locations throughout a network. One or more portions of object detection module 1005 and user interface module 1010 may reside either on the client side or the server side. Each component or module of system 1000 may communicate with each other and with external entities via communication module 1030. Each component or module of system 1000 may include its own sub-communication module to further facilitate with intra and/or inter-system communication.

User interface module 1010 contain codes, instructions, and algorithms which when executed by a processor will cause the processor to generate user interfaces 300, 400, and 490 (as described in FIGS. 4A-B, 5, and 6). User interface module 1010 may also include codes, instructions, and algorithms to perform one or more processes described in methods 700, 800, and 900.

Object detection module contains codes, instructions, and algorithms which when executed by a processor will cause the processor to perform one or more processes as described in methods 700, 800, and 900. For example, object detection module may contain instructions to determine a list of object within a certain area (e.g., target selection area 425 or 325) and to determine the nearest object to a focus point as described in methods 700 and 800 and in FIGS. 4A-6.

Object database 1015 may contain object data such as an object brand, price, expiration date, manufactured date, country of origin, material composition, sale price, percentage discount, trending data, endorsement data, latest news (e.g., subject of a recall, protest, award, honor, mentioned on the user's social network page, etc.), favorite list status, health status, stamina status, rank, class, experience, reputation, battle statistics, defensive statistics, offensive statistics, defensive abilities, offensive abilities, weapon types and statistics, available loot, etc.

Game module 1020 may include system 250 which includes game database 255, game engine 260, chat engine 265, and game-client interface 270 as describe above in FIG. 2B.

User profile database 1025 may contain user related information such as, but not limited to, account status, income bracket, age, shopping habits, playing patterns, spending power, credit line, credit history, favorite list, black list (prohibited/blocked items), address, etc.

Figure 11:
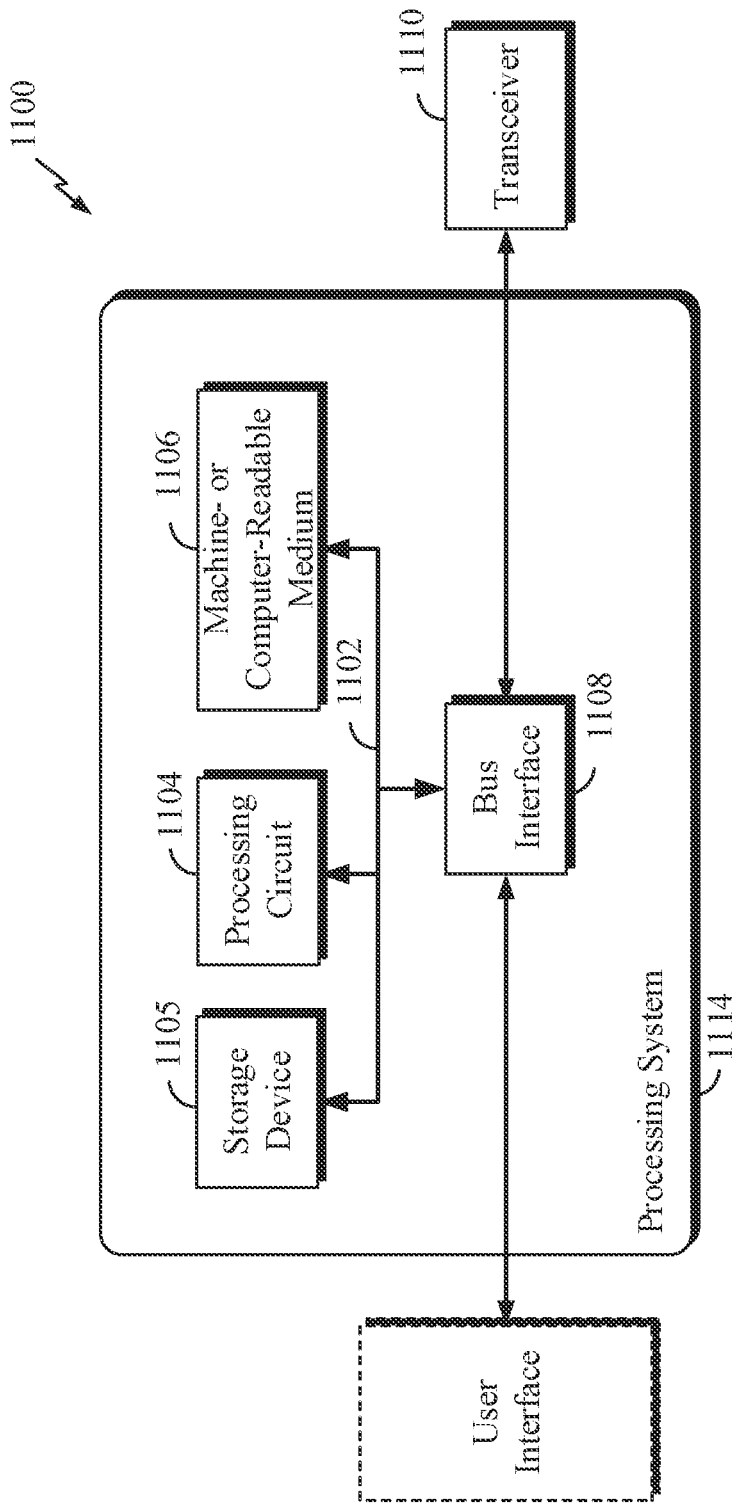
FIG. 11 is a block diagram illustrating an example of a hardware implementation for an apparatus employing a processing system that may exploit the systems and methods of FIGS. 4-9 in accordance with some embodiments of the disclosure.

FIG. 11 illustrates an overall system or apparatus 1100 in which processes 700, 800, and 900 may be implemented and user interfaces 400 and 600 may be generated. In accordance with various aspects of the disclosure, an element, or any portion of an element, or any combination of elements may be implemented with a processing system 1114 that includes one or more processing circuits 1104. Processing circuits 1104 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104 may be used to implement any one or more of the processes described above and illustrated in FIGS. 7 through 9.

In the example of FIG. 11, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links various circuits including one or more processing circuits (represented generally by the processing circuit 1104), the storage device 1105, and a machine-readable, processor-readable, processing circuit-readable or computer-readable media (represented generally by a non-transitory machine-readable medium 1108.) The bus 1102 may also link various other circuits such as timing sources, peripherals, voltage regulators, and power management circuits, which are well known in the art, and therefore, will not be described any further. The bus interface 1108 provides an interface between bus 1102 and a transceiver 1111. The transceiver 1111 provides a means for communicating with various other apparatus over a transmission medium. Depending upon the nature of the apparatus, a user interface 1112 (e.g., keypad, display, speaker, microphone, touchscreen, motion sensor) may also be provided.

The processing circuit 1104 is responsible for managing the bus 1102 and for general processing, including the execution of software stored on the machine-readable medium 1108. The software, when executed by processing circuit 1104, causes processing system 1114 to perform the various functions described herein for any particular apparatus. Machine-readable medium 1108 may also be used for storing data that is manipulated by processing circuit 1104 when executing software.

One or more processing circuits 1104 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1108. The machine-readable medium 1108 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1108 may reside in the processing system 1114, external to the processing system 1114, or distributed across multiple entities including the processing system 1114. The machine-readable medium 1108 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write infor-

Having thus described the invention, what is claimed is:

1. A method for prioritizing object selection within a three-dimensional (3D) environment comprising:
   define a target finder area within a field of view of a three-dimensional (3D) environment based on a position of a user-defined focus point within the field of view, wherein the target finder area extends away from an origin point at an angle around the focus point;
   detecting a first object and a second object within the field of view based on the defined target finder area, the first object being positioned closer to the origin point than the second object;
   retrieving object data related to the first object and object data related to the second object;
   defining a first prominence area having a first size within the 3D environment that extends outward from the first object based on the object data related to the first object and a second prominence area having a second size within the 3D environment that extends outward from the second object based on the object data related to the second object, wherein the first prominence area and the second prominence area overlap within the 3D environment;
   after the first prominence area and the second prominence area are defined within the 3D environment, defining an adjusted first prominence area and an adjusted second prominence area by reducing each of the first size and the second size until the overlap is eliminated;
   calculating a focus distance for each of the adjusted first prominence area and the adjusted second prominence area, a first focus distance corresponding to the first object calculated from the origin point to a nearest point within the 3D environment on the adjusted first prominence area and a second focus distance corresponding to the second object calculated from the origin point to the nearest point on the adjusted second prominence area; and
   responsive to determining that the second focus distance is smaller than the first focus distance, automatically selecting the second object within the user interface.

2. The method of claim 1, further comprising automatically highlighting the second object on the user interface in response to the automatic selection thereof.

3. The method of claim 2, further comprising providing for display the object data related to the highlighted second object on the user interface.

4. The method of claim 2, wherein the target finder area is displayed in front of an avatar in the 3D environment, and wherein the origin point is defined apart from the avatar.

5. The method of claim 4, further comprising designating the automatically selected object as a target of an action performed by an avatar.

6. The method of claim 1, wherein the automatic selecting of the second object is further based on cross-referencing the object data of the second object and one or more user characteristics associated with a user profile.

7. A non-transitory processor-readable medium having one or more instructions operational on a computing device, which when executed by at least one processor cause the at least one processor to:
   retrieve a user profile that includes user characteristics;
   define a target finder area within the user's field of view of a three-dimensional (3D) environment based on a position of a user-defined focus point within the field of view, wherein the target finder area extends away from an origin point at an angle around the focus point, wherein the position of the user-defined focus point is based on the user characteristic;
   detect objects within the field of view based on the defined target finder area including a first object positioned closer to the origin point than a second object;
   retrieve object data corresponding to the first object and object data corresponding to the second object;
   define a first prominence area having a first size within the 3D environment for the first object and a second prominence area having a second size within the 3D environment for the second object based on the object data corresponding to each object, wherein a region of the 3D environment is within both the first prominence area and the second prominence area;
   after the first prominence area and the second prominence area are defined within the 3D environment, define an adjusted first prominence area and an adjusted second prominence area by reducing each of the first size and the second size until the region is eliminated;
   calculate a focus distance for each of the adjusted first prominence area and the adjusted second prominence area, a first focus distance corresponding to the first object calculated from the origin point to a nearest point within the 3D environment on the adjusted first prominence area and a second focus distance corresponding to the second object calculated from the origin point to the nearest point on the adjusted second prominence area; and
   automatically select the second object in response to a determination that the second focus distance is smaller than the first focus distance.

8. The non-transitory processor-readable medium of claim 7, wherein the instructions further cause the at least one processor to:
   automatically highlight the second object in a user interface that overlays the user's field of view in response to the automatic selection thereof.

9. The non-transitory processor-readable medium of claim 8, wherein the instructions further cause the at least one processor to:
   provide for display the object data related to the highlighted second object on the user interface.

10. The non-transitory processor-readable medium of claim 8, wherein the instructions further cause the at least one processor to:
    designate the automatically selected second object as a target of an action performed by an avatar within the 3D environment controlled by the user.

11. The non-transitory processor-readable medium of claim 7, wherein automatic selection of the second object further based on a cross-reference of the object data related to the second object and the user characteristics.

12. The non-transitory processor-readable medium of claim 7, wherein object data for each object includes at least one of a health status, a character class type, a character rank, a percentage discount, a price, or a match with the user profile.

13. The non-transitory processor-readable medium of claim 12, wherein each prominence area has a size determined based on a change in the health status.

14. The non-transitory processor-readable medium of claim 12, wherein each prominence area has a size determined based on the percentage discount.

15. The non-transitory processor-readable medium of claim 12, wherein the match with the user profile comprises an indication that the object was previously purchased, on a shopping list, previously examined, or appeared on a personal social network page.

16. The non-transitory processor-readable medium of claim 7, wherein a size of the first prominence area or the second prominence area are adjusted based at least in part on another prominence area corresponding to another object within the defined target finder area.

17. The non-transitory processor-readable medium of claim 7, wherein the instructions further cause the at least one processor to:
define a first prominence score for the first object and a second prominence score for the second object based on the object data corresponding to each object;
wherein automatic selection of the second object is further based on the first prominence score and the second prominence score.

18. The non-transitory processor-readable medium of claim 7, wherein the target finder area is defined by a maximum target range and a user-defined field of view.

19. The non-transitory processor-readable medium of claim 7, wherein the instructions further cause the at least one processor to:
reposition the target finder area within the user interface based on a received first instruction to simulate a move of the focus point to a different location within the user interface; and
provide for display a set of potential targets determined within the repositioned target finder area, wherein the second object remains selected during the simulated move.

20. The non-transitory processor-readable medium of claim 19, wherein the instructions further cause the at least one processor to:
automatically select a target object from the set of potential targets in response to a second instruction to perform the simulated move of the focus point.

* * * * *